UNITED STATES PATENT OFFICE.

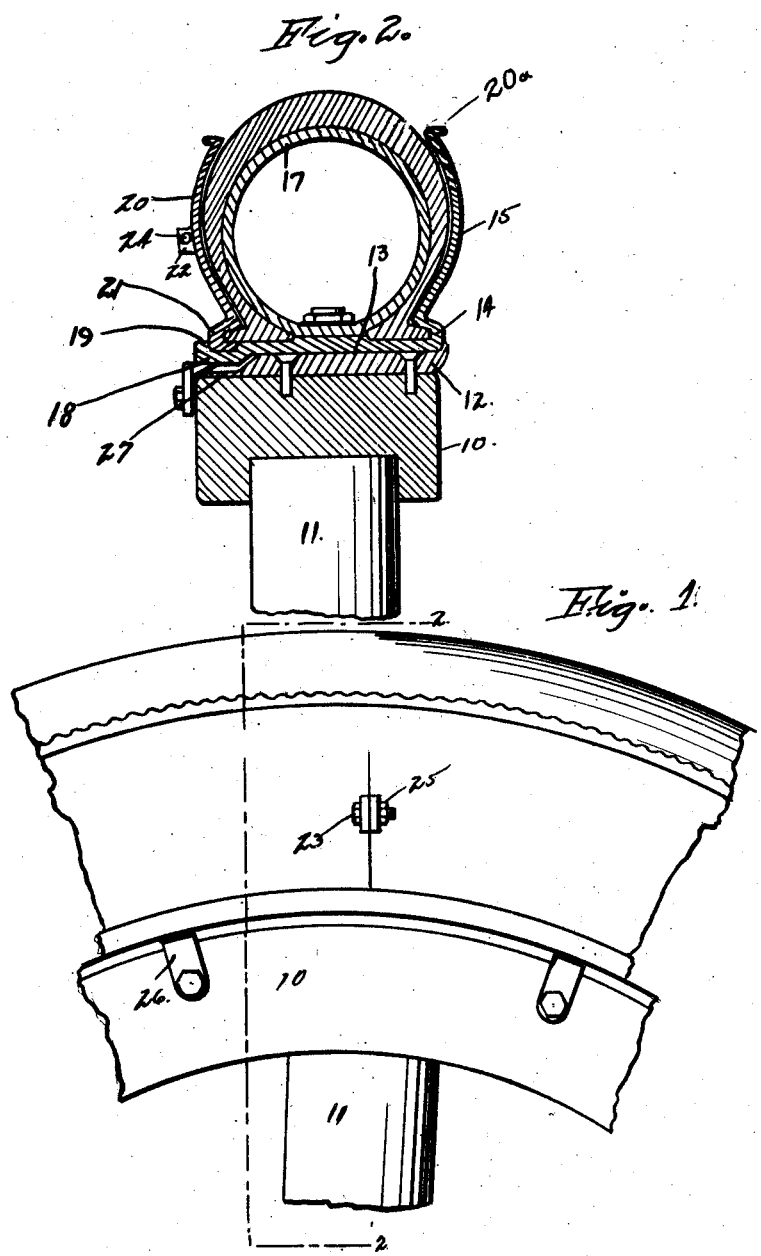

MARK HOLLISTER, JR., OF FORT DODGE, IOWA.

DEMOUNTABLE RIM.

1,345,332.	Specification of Letters Patent.	Patented June 29, 1920.

Application filed July 5, 1918. Serial No. 243,370.

*To all whom it may concern:*

Be it known that I, MARK HOLLISTER, Jr., a citizen of the United States, and a resident of Fort Dodge, in the county of Webster and State of Iowa, have invented a certain new and useful Demountable Rim, of which the following is a specification.

The object of my invention is to provide a demountable rim of simple, durable and inexpensive construction.

More particularly it is my object to provide a demountable rim adapted to support and carry a tire, and to be mounted on the felly or fixed rim of the wheel in the ordinary way, and having on opposite sides annular members projecting along side the tire and adapted to receive the wear of travel when the tire becomes deflated beyond a certain point.

Still a further object is to provide such a demountable rim of peculiar construction, whereby the parts may be readily assembled and connected.

With these and other objects in view my invention consists in the construction, arrangement and combination of the various parts of the device, whereby the objects contemplated are attained, as hereinafter more fully set forth, pointed out in my claim and illustrated in the accompanying drawings, in which:

Figure 1 shows a side elevation of a portion of a wheel equipped with a demountable rim embodying my invention.

Fig. 2 shows a vertical, sectional view taken on the line 2—2 of Fig. 1.

In the accompanying drawings, I have used the reference numeral 10 to indicate generally the felly of a wheel to which the spoke 11 is attached. On the periphery of the felly is the metal fixed rim 12.

My improved demountable rim comprises an annular band or ring 13 having at one edge an inwardly opening channel-shaped portion 14 from which there extends outwardly a curved flange 15 designed to fit the side of the tire and project outwardly along side the tire, such a distance that when the tire is materially deflated the flange 15 will receive the wear of travel.

The channel-shaped portion 14 is designed to receive the bead of a tire 16 in which is an inner tube 17.

Near its edge opposite the channel-shaped portion 14 the annular band or ring 13 is formed with an annular rib 18 on its inner or under surface and with an annular groove 19 in its outer surface.

A coacting member for locking the tire on the demountable rim and for serving as a means on which the machine may travel when the tire is deflated, is provided consisting of an annular member 20 in the form of a split ring which has the same general shape as the member 15.

At the inner edge of the member 20 is a channel-shaped member 21, similar in shape to the channel-shaped member 14, the lower portion of which is designed to be received in the annular groove 19.

Adjacent to the opposite end edges of the member 20 are laterally extending flanges 22.

In the installation of my improved demountable rim, the tire is placed on the rim member 13 in deflated condition. The member 20 is then sprung open and pushed sidewise against the tire until it is in position for slipping the inner part of the channel-shaped member 21 into the groove 19.

A bolt 23 is inserted through the openings 24 in the flanges 22 and receives a nut 25 which may be screwed up for tightening the member 20 on the member 13.

The tire may then be inflated, and it is obvious that the demountable rim will be firmly held in position.

My demountable rim may be mounted on the wheel in the ordinary way by means of movable lugs 26 or in any suitable way.

The advantages of a device of the kind may be largely seen from the foregoing description.

The parts are of extremely simple and inexpensive construction; are quickly and easily assembled or taken apart and may be used in the same way as in ordinary demountable rims. A spare tire can be carried on a rim of this kind.

It will be noted that the rib 18 projects radially inwardly on the wheel and thereby affords a better grip for the lug or other means, whereby the demountable rim is locked on the wheel. In the form of the device shown in the drawings the metal rim 12 is provided with a groove 27 to receive the rib 18.

It may be noted that the outer edges of the members 15 and 20 are formed with laterally extending beads 20$^a$, as illustrated in Fig. 2.

It may be also noted that the outer edge of each of these members 15 and 20 is provided with a series of studs or the like 20^b. Any suitable form of these studs may be employed for providing a surface or gripping edge which will serve as an anti-skidding device when the driver of the car is compelled to travel on the flanges 15 and 20 of the demountable rim.

It will be understood that my demountable rim has the great advantage of furnishing a means on which the car will travel if a tire should become deflated accidentally or otherwise.

In this connection it may be noted that the wheel having a deflated tire would drop very little, so that the car will tend to travel almost in the normal way with the exception of the loss of resiliency.

Not only will this device eliminate a large part of the road trouble with tires, by permitting the user of the car to drive in on the demountable rim, but even more important is the fact that dangerous accidents which might otherwise occur will be practically avoided.

It is well-known that if a car is being driven along the road and the tire should blow out, the car is very likely to swing and if the car is along side a ditch a dangerous accident may occur. Such accidents are rather frequent, but with a device of this kind there is no danger of an accident of the kind mentioned.

It is also well-known that one of the commonest tire troubles arises from rim cutting of the casing. With a device of this kind a rim cut is impossible, and hence there will be effected a very substantial saving in tire expense.

Another advantage arising from the use of a demountable rim of this type arises from the fact that where my rims are used, the tire can be built with a considerable saving of material at the sides which are in danger of rim cut, and also are supported by the flanges of the demountable rim, and additional material if desired may be placed on the tread of the tire whereby much greater mileage can be had from the tire than is possible with tires used without demountable rims of this type.

Another advantage arises from the fact that on account of the support given to the tire by the flanges of my improved demountable rim at the side of the tire, the tire can be run under less air pressure than where such rims are not used, which results in less strain on the tire and an increase in the mileage which can be secured from it.

When the rim with the tire thereon is on the wheel and the tire becomes deflated the machine will travel on the members 30 and 15, instead of on the rim cutting the tire, whereby there is affected a substantial tire saving.

Some changes may be made in the construction and arrangement of the parts of my improved demountable rim without departing from the essential features and purposes of my invention, and it is my intention to cover by my claim any modified forms of structure or use of mechanical equivalents which may be included within the scope of my claim.

I claim as my invention:

In a device of the character described, a demountable rim, comprising an annular rim member having on its outer surface an annular rib, having adjacent to each of its sides a channel shaped portion adapted to receive the bead of a tire, an annular outwardly extending curved flange formed on one of said channel shaped portions, said flange being designed to rest snugly against a portion of the side of the tire, when it is inflated, an annular groove formed in said rim adjacent to the free channel shaped portion, an annular member having the form of a split ring adapted to fit in said groove for holding the tire on said rim, said last described member having an outwardly extending curved flange formed thereon, and adapted to rest snugly against the free side of the tire, means for locking the ends of the last described annular member together, a tread surface formed on the outer edge of both of said curved flanges, whereby when the tire becomes deflated, the tread surfaces will engage with the road, while the tire will be received between said flanges and be protected thereby.

Des Moines, Iowa, June 17, 1918.

MARK HOLLISTER, Jr.